July 23, 1957 R. C. RUMBLE 2,800,019
DENSITY COMPENSATING FLOWMETER
Filed June 11, 1953 2 Sheets-Sheet 1
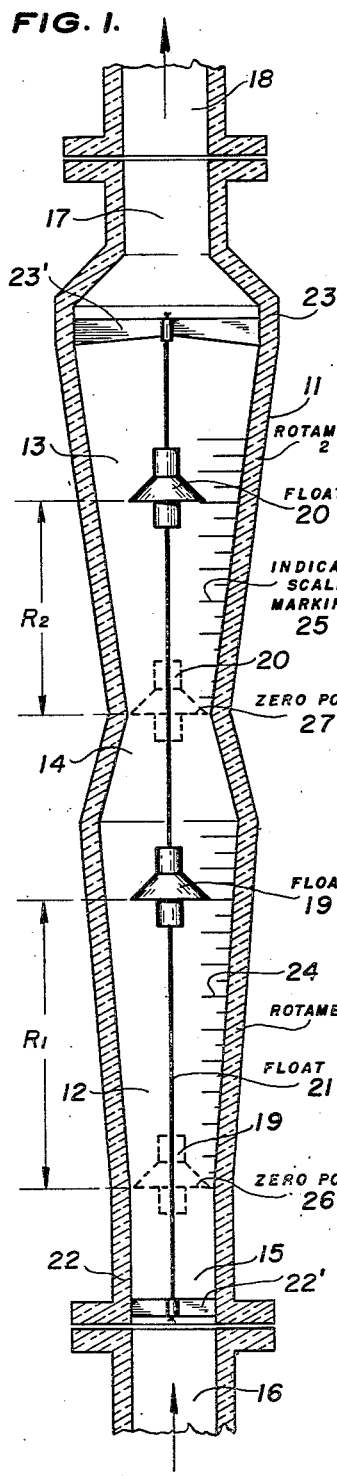
*INVENTOR.*
Robert C. Rumble,
BY
*ATTORNEY.*

July 23, 1957  R. C. RUMBLE  2,800,019
DENSITY COMPENSATING FLOWMETER
Filed June 11, 1953  2 Sheets-Sheet 2

INVENTOR.
Robert C. Rumble,
BY
ATTORNEY.

2,800,019

DENSITY COMPENSATING FLOWMETER

Robert C. Rumble, Houston, Tex., assignor, by mesne assignments, to Esso Research and Engineering Company, Elizabeth, N. J., a corporation of Delaware Application June 11, 1953, Serial No. 360,974

2 Claims. (Cl. 73—209)

The present invention is directed to a flowmeter of the rotameter type. In its more specific aspects, the invention is directed to a flowmeter which allows accurate determination of fluid flow over a range of fluid densities.

The present invention may be briefly described as a device for determining fluid flow which comprises an elongated member provided with two interconnected first and second horn-shaped chambers in unrestricted fluid communication with each other having apexes pointing in a direction opposite to the direction of flow, the open apex of the second chamber being connected to the open base of the first chamber. A float is arranged in each chamber and a guide member is provided in each chamber for centering the floats. The device is provided with an indicating means for showing the position of each of said floats in said chamber.

The two chambers are provided with a wall having a horn shape such that the float at its largest diameter or dimension and the wall define a plane annulus having an area which varies as the square of the height of the float with reference to a fixed point in the two chambers.

The invention will be further illustrated by reference to the drawing in which:

Fig. 1 is a sectional view of one embodiment;

Fig. 2 is a modification of the device of Fig. 1, showing an arrangement for displaying the position of the floats in the chambers;

Fig. 4 is a further modification showing guide fins for centering the floats;

Fig. 5 is a view taken along the lines III—III of Fig. 4;

Fig. 6 is a view of the float showing the preferred shape; and

Figure 3:
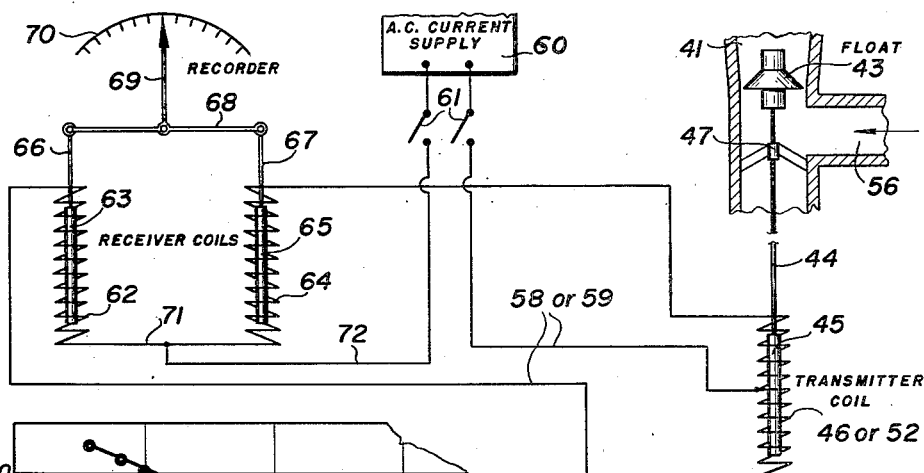
Fig. 3 is a wiring diagram showing a recorder for recording automatically the position of the floats in Fig. 2.

Referring now to the drawing and particularly to Fig. 1, numeral 11 designates an elongated member in which is provided a first chamber 12 and a second chamber 13. The first chamber 12 is connected to the second chamber 13 at a restricted portion 14 of the elongated member 11. The first chamber 12 is provided with an inlet 15 connected to a conduit 16 and the second chamber 13 is provided with an outlet 17 connected to a conduit 18.

Arranged in the first chamber 12 is a float 19 and arranged in the second chamber 13 is a float 20. Floats 19 and 20 are slidably mounted on a guide means 21 which is centrally disposed in the elongated member 11 and is attached to first and second ends 22 and 23, respectively, of the elongated member 11 by spider mounts 22' and 23'. The elongated member 11 is preferably provided on its outer surface with indicator scale markings 24 for the first chamber 12 and scale markings 25 for the second chamber 13 when the device is constructed of transparent material such as glass and the like.

It will be noted that the two chambers 12 and 13 have a so-called horn shape such that the interior wall and the float at its largest diameter define a plane annulus having an area which varies as the square of the height of the float with reference to a fixed point in said chambers. The principle on which the present invention is based is shown mathematically hereinafter.

The position of floats 19 and 20 when no fluid is being flowed through the elongated member 11 is shown in the dotted lines where the floats 19 and 20 are at the zero positions 26 and 27, respectively.

Referring now to Fig. 2 a device similar to that of Fig. 1 is shown wherein an elongated member 40 is provided with a first chamber 41 and a second chamber 42. Arranged in the first chamber 41 is a first float 43 which is connected to a suitable rod or member 44, the free end of which is provided with a soft iron armature 45 which is arranged in balanced impedance coils 46. The rod member 44 passes through a guide member 47 which does not isolate the armature and the impedance coils 46 housed in the chamber 48 from the flowing fluid. Arranged in the second chamber 42 is a second float 49 which likewise is attached to a rod member 50, the free end of which is a soft iron armature 51 which is disposed in balanced impedance coils 52. The balanced impedance coils are arranged in a section 53 which encloses the impedance coils 52. The rod member 50 projects through guide member 54 into the section 53 which is open to the flowing fluid.

The first chamber 41 has an inlet 56 through which fluid is flowed into chamber 41 and thence into chamber 42 and the second chamber 42 has an outlet 57 for discharge of fluid from the chamber 42.

Electrical leads 58 and 59 are connected, respectively, to impedance coils 46 and 52 and connect the impedance coils 46 and 52 electrically to a recorder shown in Fig. 3.

Referring now to Fig. 3, numerals 58 and 59 designate the electrical leads either from impedance coil 46 or 52. For purposes of this description only one of the transmitter impedance coils will be shown and described, and will be described with respect to the float 43 and the rod member 44 in the guide member 47 in the chamber 41. It will be seen that the soft iron armature 45 is arranged in the balanced impedance coil 46 which is connected by leads 58 to a source of current supply 60 through switches 61 which close the circuit to provide energy to energize the recording device. The electrical leads 58 are connected to the source of current supply and to a first receiver impedance coil 62 in which is arranged a soft iron armatrue 63. A second receiver impedance coil 64 has a soft iron armature 65 arranged therein and these soft iron armatures 63 and 65 are interconnected through rod members 66 and 67 by way of an interconnecting linkage 68 which is connected to an indicator means 69 which may be an electrical device or a recorder pin to provide a record on the scale 70. The coils 62 and 64 are connected electrically through lead 71 with the source of current supply by electrical lead 72 which on closing of one of the switches 61 completes the circuit.

The devices of Figs. 2 and 3 may suitably be used where the apparatus is constructed of material which will not allow visual observation of the float heights.

Referring now to Fig. 4, a modification of the device of Fig. 1 is shown where only the lower portion of the housing will be described. Referring to Fig. 4, numeral 80 designates an elongated member provided with a first chamber 81 in which is arranged a first float 82. The first chamber 81 has longitudinally disposed fins 83 which serve to center the float 82.

The dotted lines show a restricted portion 84 and the lower part of the second chamber 86 which is similarly provided with guide fins, such as 83, not shown. The lower part of the chamber 81 communicates by an inlet 87 with a source of fluid.

Referring now to Fig. 5, which is a view taken along the lines III—III of Fig. 4, it will be seen that the guide fins 83 allow centering of the float 82 in the chamber 81.

Referring to Fig. 6, which shows a diagram of the preferred type of float, such as 19, 20, 43, 49, or 82, that will eliminate or minimize any effects due to the viscosity of the fluid metered, the diameter "$d$" must be equal to or less than 0.6 of the diameter "$D$," and angle "$a$" must be equal to or less than 60°. Other dimensions of the float are not critical.

The present invention is based on the principle that the flow coefficient of a float in a device of the nature of the present invention is virtually a constant for fluids having a wide range of viscosities. Thus in a device of the nature provided in the present invention where the flow of fluid is common to both floats and where the chambers are provided with an interior wall having a shape such that the float at its largest diameter and the wall of the chambers define a plane annulus having an area which varies as the square of the height of the float with reference to a fixed point in the chambers, the density of the fluid stream is a function of the ratio of the respective positions of the floats with reference to a fixed point. From the density value thus determined, the true value of volumetric flow may be readily deduced from either float reading. The mass flow may be deduced likewise. In a general case the fluid density measurement in a device of the nature of Figs. 1 to 6 where the flow coefficient is equal for each of the flow meters with fluids being considered, the following relationships obtain:

$$Q_1 = A_{w_1} C \sqrt{\frac{2gV_{f_1}}{A_{f_1}}} \cdot \sqrt{\frac{\rho_{f_1} - \rho_w}{\rho_w}} =$$

$$Q_2 = A_{w_2} C \sqrt{\frac{2gV_{f_2}}{A_{f_2}}} \cdot \sqrt{\frac{\rho_{f_2} - \rho_w}{\rho_w}}$$

or $$A_{w_1} \sqrt{\frac{V_{f_1}}{A_{f_1}}} \sqrt{\frac{\rho_{f_1} - \rho_w}{\rho_w}} = A_{w_2} \sqrt{\frac{V_{f_2}}{A_{f_2}}} \sqrt{\frac{\rho_{f_2} - \rho_w}{\rho_w}}$$

or $$\frac{A_{w_1}}{A_{w_2}} = \sqrt{\frac{V_{f_2} A_{f_1}}{A_{f_2} V_{f_1}}} \cdot \sqrt{\frac{\rho_{f_2} - \rho_w}{\rho_{f_1} - \rho_w}}$$

where
$Q_1$ and $Q_2$ = volumetric flow rate
$A_{w_1}$ and $A_{w_2}$ = area of the plane annulus defined by the interior wall of the chamber and the float at its largest diameter
$C$ = flow coefficient
$g$ = acceleration of gravity
$V_{f_1}$ and $V_{f_2}$ = volume of floats
$\rho_{f_1}$ and $\rho_{f_2}$ = weight density of floats
$\rho_w$ = weight density of fluid
$A_{f_1}$ and $A_{f_2}$ = cross sectional area of largest part of float The rotameter chambers are horn-shaped and are designed in such a manner that the annular area around the float is proportional to the square of the float position height. Therefore, with proportionality constants $a$ and $b$ relating height reading $R_1$ and $R_2$ to the corresponding areas $A_{w_1}$ and $A_{w_2}$, respectively, the following expression may be derived:

$$\frac{a(R_1)^2}{b(R_2)^2} = \sqrt{\frac{V_{f_2} A_{f_1}}{A_{f_2} V_{f_1}}} \cdot \sqrt{\frac{\rho_{f_2} - \rho_w}{\rho_{f_1} - \rho_w}}$$

This general expression and the derivatives thereof show that for the two given chambers, such as the devices illustrated above, the ratio of the two readings is independent of the flow rate and depends only on the density of the fluid flowing therethrough.

This may be shown for a particular system such as in Figs. 1, 2 or 4 for fluids with specific gravities ranging from about 1.02 to 0.4. For purposes of this illustration the following data may be obtained for the structures designated generally in Fig. 1 as rotameter 1 and rotameter 2 which embrace the device of the present invention:

| Rotameter #1 | Rotameter #2 |
|---|---|
| $\rho_{f_1} = 10$ | $\rho_{f_2} = 1.1$ |
| $V_{f_1}$ = | $V_{f_2}$ |
| $A_{f_1}$ = | $A_{f_2}$ |

If it is desired that each of the rotameters read the same over the whole scale when water, for example, is flowing, then the following expressions are derived:

$$\frac{a(R_1)^2}{b(R_2)^2} = \sqrt{\frac{V_{f_2} A_{f_1}}{A_{f_2} V_{f_1}}} \cdot \sqrt{\frac{1.1 - 1}{10 - 1}}$$

$$\frac{a}{b} = \sqrt{\frac{.1}{9}} \cdot \frac{1}{9.48}$$

or $$b = 9.48 a$$

This relationship determines the relative tapers of the two rotameter chambers.

Had other values been assigned to the terms in the expression, $$\sqrt{\frac{V_{f_2} A_{f_1}}{A_{f_2} V_{f_1}}}$$

so that the expression no longer equaled 1, the value of the ratio $a/b$ would have been different. This would have resulted in different tapers for the two rotameter chambers, but the compensating effect on the ratio, $a/b$, of a different value for $$\sqrt{\frac{V_{f_2} A_{f_1}}{A_{f_2} V_{f_1}}}$$

would, as in the case where $$\sqrt{\frac{V_{f_2} A_{f_1}}{A_{f_2} V_{f_1}}}$$

equaled 1, give the following mathematical expression for a fluid of density, $\rho_W$ and an arbitrary value of 1 for $a$.

$$\frac{R_1^2}{9.48 R_2^2} = \sqrt{\frac{1.1 - \rho_w}{10 - \rho_w}}$$

In other words, as long as the flow coefficients are equal, the float densities remain unchanged, and the shapes of the rotameters are such that the chamber wall and the float at its largest diameter define a plane annulus having an area which varies as the square of the height of the float with reference to a fixed point in said chambers, then for two rotameters satisfying these conditions the ratios of the readings is a function solely of the density of the flowing fluid. By squaring each of the expressions in the above identtity, the following result is obtained:

$$\frac{R_1^4}{90 R_2^4} = \frac{1.1 - \rho_w}{10 - \rho_w}$$

or $$10 R_1^4 - R_1^4 \rho_w = 99 R_2^4 - 90 \rho_w R_2^4$$

or $$90\rho_w R_2^4 - R_1^4 \rho_w = 99R_2^4 - 10R_1^4$$

or $$\rho_w = \frac{99R_2^4 - 10R_1^4}{90R_2^4 - R_1^4} = 1.1 - \frac{8.9R_1^4}{90R_2^4 - R_1^4}$$

Figure 7:
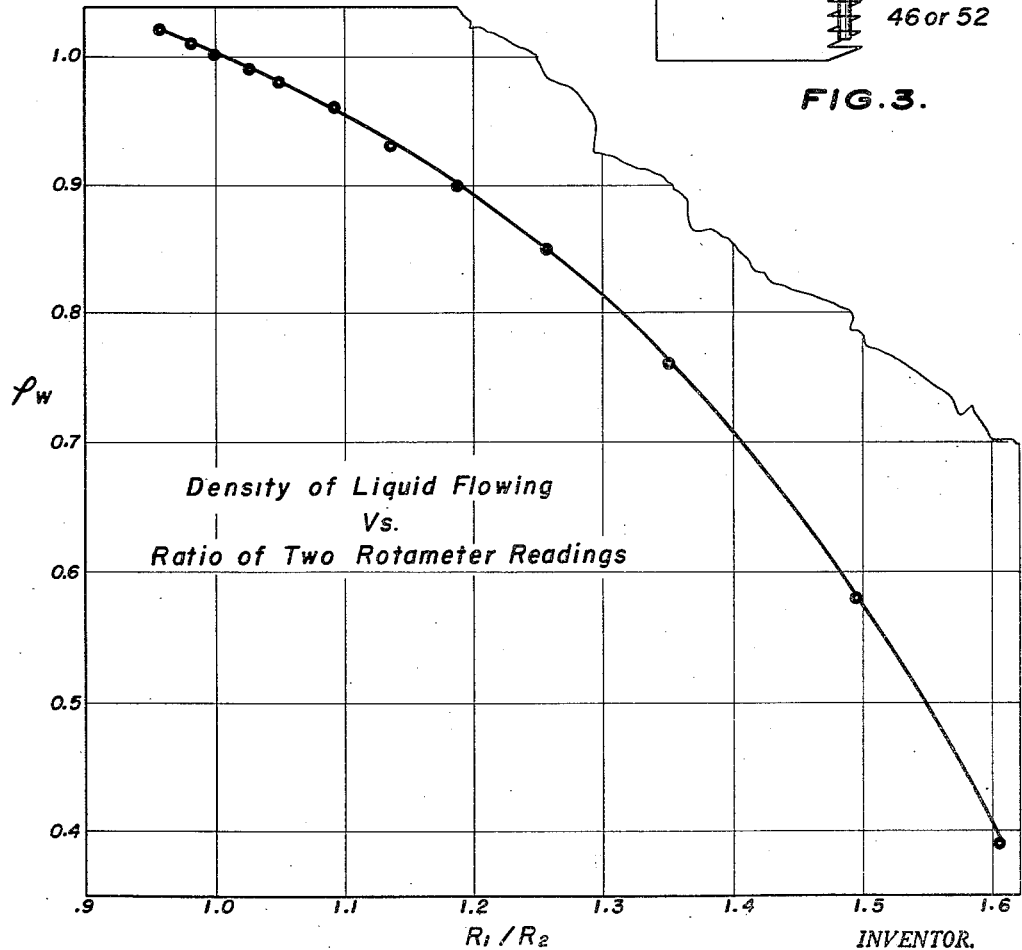
Fig. 7 is a graph of data taken from Table I showing the relationship of the ratio of $R_1$ to $R_2$ with the density of fluids varying from 0.4 to 1.02. The density is $\rho_w$ in the data in Table I.

The values of $\rho_w$ (density) for various ratios of $R_1$ and $R_2$ are shown in Table I and plotted in Fig. 7:

Table I

| $R_1$ | $R_1^4$ | $R_2$ | $R_2^4$ | $\frac{R_1}{R_2}$ | $\rho_w$ |
|---|---|---|---|---|---|
| 1 | 1 | 1      | 1    | 1     | 1    |
| 1 | 1 | 1.046  | 1.2  | 0.956 | 1.02 |
| 1 | 1 | 1.024  | 1.1  | 0.977 | 1.01 |
| 1 | 1 | 0.974  | 0.9  | 1.026 | 0.99 |
| 1 | 1 | 0.946  | 0.8  | 1.057 | 0.98 |
| 1 | 1 | 0.9147 | 0.7  | 1.093 | 0.96 |
| 1 | 1 | 0.8801 | 0.6  | 1.136 | 0.93 |
| 1 | 1 | 0.8409 | 0.5  | 1.189 | 0.90 |
| 1 | 1 | 0.7953 | 0.4  | 1.257 | 0.85 |
| 1 | 1 | 0.7401 | 0.3  | 1.351 | 0.76 |
| 1 | 1 | 0.6687 | 0.2  | 1.495 | 0.58 |
| 1 | 1 | 0.6223 | 0.15 | 1.606 | 0.39 |

The value of the ratio $R_1$ to $R_2$ may be determined from continuous recordings of $R_1$ and $R_2$ made automatically or visually. This may be accomplished by electrical or mechanical means. $\rho_w$ may be read from a table or graph of particular values of the ratio of $R_1$ to $R_2$ or may be determined directly by relating the ratio of $R_1$ to $R_2$ by electrical or mechanical means.

The device of the present invention may be suitably connected into a line through which oil, gas, or similar fluids are flowing and for which it is desired to determine the rate of flow. Also it may be adapted to be inserted in a borehole for the purpose of metering fluid flow therein. The fluid would flow into the inlet through the device and out through the outlet causing the floats in the serially connected rotameters to rise in the first and second chambers; the heights of which in the chambers are read substantially simultaneously. Readings may be taken either automatically or visually to determine the values for $R_1$ and $R_2$. From either of these values the mass flow rate and the volume flow rate may be determined utilizing the value of the density of the fluid derived from the ratio of these readings.

The device of the present invention has numerous advantages over the conventional device including a rotameter having a single chamber with an engraved scale on the exterior surface of a transparent chamber. Thus the instrument may be calibrated by running water having a specific gravity of 1 through the rotameter and providing a table showing float height on the scale versus the volume of fluid flowing through the rotameter per hour. This conventional instrument is suitable only for fluids having a constant specific gravity when measuring in volumetric units. For example, for a fluid having a specific gravity of 0.8, by means of the fundamental rotameter equation and without calibrating the instrument with a fluid of the given specific gravity, a chart might be constructed showing the float height plotted against the volume of fluid flowing per unit of time. Then knowing the density by measuring it and the volume flowing, it is possible to determine the mass rate of flow.

However, if a conventional type of rotameter is used to measure flowing fluid where the density is varying considerably over a wide range, it is difficult to determine the volume rate of fluid flow. For example, a change in the reading might indicate a change in the volume of fluid flow without a change in density or it might indicate a change in density without a change in the volume rate of flow. Also it might mean a change in both density and volume rate of flow. Without continuous density measurements simultaneously with readings of the single chamber rotameter, there is no unique way to account for changes in float height readings of the instrument.

In the present invention where the instrument provides for serial flow through superimposed dual chambers with no change in density, the ratios of the readings remain constant. From the ratio of simultaneous readings, the density may be determined directly. With the density known either reading may be easily converted to volume or mass flow as in the case of the prior art rotameter with a single chamber. Thus the device of the present invention embodying super-imposed chambers provides an instrument that yields a continuous density reading of the fluid flowing through it at the same time that it yields float heights from either of which, using the density data, volume rate and mass rate of flow may be determined. This is particularly advantageous where the device is used in measuring fluids such as mixtures of oil and gas or oil, gas and water such as encountered frequently in petroleum production. There are many uses to which such a device may be put in the chemical industry where immiscible fluids are employed or where one fluid has dissolved in or has intermixed with it another fluid.

The present invention has wide utility and may be employed in flowing streams, such as pipe lines, oil and gas flowmeters, in measuring rate of flow of oil, water or gas or two or more of these fluids. For example, the invention has ready adaptability for application in a pipe line where one product is flowed ahead of two or more products and there is some co-mingling at the interface.

The nature and objects of the present invention having been completely described and illustrated, what I wish to claim as new and useful and to secure by Letters Patent is:

1. A device for determining mass fluid flow under variable flow conditions which comprises an elongated hollow member having an inlet and an outlet at its respective ends and further provided with interconnected first and second tapered tubular chambers in unrestricted fluid communication having their smaller ends pointing in a direction opposite to the direction of flow, a float arranged in each chamber, said floats being of different densities and having the same volumes and same maximum diameters, said chambers having different tapers, guide means in each chamber for centering said floats, and means for indicating the position of each of said floats in said chambers, the tapers of said chambers being such that each float at its largest diameter and the cooperating wall define a plane annulus having an area which varies as a square of the height of the float with reference to a fixed point in said chambers.

2. A device for determining mass fluid flow under variable flow conditions which comprises an elongated hollow member having an inlet and an outlet at its respective ends and further provided with two interconnected first and second tapered tubular chambers in unrestricted fluid communication with each other having their smaller ends pointing in a direction opposite to the direction of flow, guide means centrally disposed in said elongated member, a float member slidably arranged on said guide means in each of said chambers, said floats being of different densities and having the same volumes and the same maximum diameters, said chambers having different tapers, and means for indicating the position of each of said float members in said chambers, the tapers of said chambers being such that each float at its largest diameter and the cooperating wall define a plane annulus having an area which varies as a square of the height of the float with reference to a fixed point in said chambers whereby the ratio of the heights of the floats remains constant during varying rates of flow.

(References on following page)

References Cited in the file of this patent

UNITED STATES PATENTS

| | | |
|---|---|---|
| 1,965,333 | Connell | July 3, 1934 |
| 2,073,372 | Heidbrink | Mar. 9, 1937 |
| 2,321,041 | Porter | June 8, 1943 |
| 2,348,732 | Fischer | May 16, 1944 |
| 2,414,086 | Brewer | Jan. 14, 1947 |
| 2,437,247 | Fischer | Mar. 9, 1948 |

OTHER REFERENCES

A publication, Bulletin No. 412–0538 by the Commercial Engineering Laboratories, Detroit, Mich., 4612 Woodward Avenue, issued May 1938, showing the type VI Air Flow Indicator.